United States Patent
Winter

(10) Patent No.: US 8,573,957 B2
(45) Date of Patent: *Nov. 5, 2013

(54) RAMPED STIFFENER AND APPARATUS AND METHOD FOR FORMING THE SAME

(75) Inventor: Darren John Winter, Bristol (GB)

(73) Assignee: Airbus Operations Limited, Bristol (GB)

(*) Notice: Subject to any disclaimer, the term of this patent is extended or adjusted under 35 U.S.C. 154(b) by 148 days.

This patent is subject to a terminal disclaimer.

(21) Appl. No.: 13/003,860

(22) PCT Filed: Jul. 14, 2009

(86) PCT No.: PCT/GB2009/050845
§ 371 (c)(1),
(2), (4) Date: Jan. 12, 2011

(87) PCT Pub. No.: WO2010/007416
PCT Pub. Date: Jan. 21, 2010

(65) Prior Publication Data
US 2011/0183106 A1    Jul. 28, 2011

(30) Foreign Application Priority Data
Jul. 18, 2008 (GB) .................................. 0813146.8

(51) Int. Cl.
*B29C 70/50* (2006.01)

(52) U.S. Cl.
USPC ........... 425/112; 425/183; 425/329; 425/335; 425/363; 425/366; 425/DIG. 5

(58) Field of Classification Search
USPC ............ 425/329, 363, DIG. 5, 366, 183, 335, 425/112
See application file for complete search history.

(56) References Cited

U.S. PATENT DOCUMENTS

| | | | | |
|---|---|---|---|---|
| 2,471,490 A | * | 5/1949 | Mercer | 72/178 |
| 2,655,194 A | | 10/1953 | Nilsson | |
| 3,355,922 A | | 12/1967 | Utashiro et al. | |
| 3,657,911 A | | 4/1972 | Clarke et al. | |
| 3,838,590 A | | 10/1974 | Van Dijk | |
| 3,914,971 A | | 10/1975 | Colbath | |
| 4,006,617 A | * | 2/1977 | Foster | 72/10.1 |
| 4,084,029 A | | 4/1978 | Johnson et al. | |

(Continued)

FOREIGN PATENT DOCUMENTS

| | | |
|---|---|---|
| DE | 1452724 | 3/1969 |
| DE | 1452724 A1 | 5/1969 |

(Continued)

OTHER PUBLICATIONS

ISR for PCT/GB2009/050845 mailed Mar. 12, 2010.

(Continued)

*Primary Examiner* — Amjad Abraham
(74) *Attorney, Agent, or Firm* — Lowe Hauptman & Ham, LLP

(57) ABSTRACT

A die tool for forming a C-section component having radiused shoulders has first and second outer dies, each outer die having a truncated conical portion connected to a flange portion by a radiused portion and being symmetrically disposed to one another along a common axis such that each flange portion is outermost, and a cylindrical outer support die located between the first and second outer dies.

10 Claims, 7 Drawing Sheets

(56) References Cited

U.S. PATENT DOCUMENTS

| | | |
|---|---|---|
| 4,331,723 A | 5/1982 | Hamm |
| 4,913,910 A | 4/1990 | McCarville et al. |
| 5,026,447 A | 6/1991 | O'Connor |
| 5,036,688 A | 8/1991 | Gillean |
| 5,074,139 A * | 12/1991 | Elliott .................. 72/129 |
| 5,096,525 A | 3/1992 | Engwall |
| 5,171,510 A | 12/1992 | Barquet et al. |
| 5,182,060 A | 1/1993 | Berecz |
| 5,538,589 A | 7/1996 | Jensen et al. |
| 5,729,462 A | 3/1998 | Newkirk et al. |
| 5,820,804 A | 10/1998 | Elmaleh |
| 5,984,511 A | 11/1999 | Vasey-Glandon et al. |
| 6,114,012 A | 9/2000 | Amaoka et al. |
| 6,355,133 B1 | 3/2002 | Williams |
| 6,478,922 B1 | 11/2002 | Rosevear et al. |
| 6,513,757 B1 | 2/2003 | Amaoka et al. |
| 6,569,371 B1 | 5/2003 | Asari et al. |
| 6,701,990 B1 | 3/2004 | Burley et al. |
| 6,783,718 B2 | 8/2004 | Blanchon et al. |
| 6,814,916 B2 | 11/2004 | Willden et al. |
| 6,890,470 B2 | 5/2005 | Staub et al. |
| 7,141,199 B2 | 11/2006 | Sana et al. |
| 7,195,203 B2 | 3/2007 | Livingstone et al. |
| 7,469,735 B2 | 12/2008 | Brown et al. |
| 7,682,682 B2 | 3/2010 | Leon-Dufour et al. |
| 2007/0175573 A1* | 8/2007 | Fox et al. .................. 156/196 |
| 2011/0076461 A1 | 3/2011 | Jacob et al. |

FOREIGN PATENT DOCUMENTS

| | | |
|---|---|---|
| EP | 0395224 A2 | 10/1990 |
| EP | 1070661 A2 | 1/2001 |
| EP | 1134070 | 9/2001 |
| EP | 1134070 A1 | 9/2001 |
| EP | 1408224 | 4/2004 |
| EP | 1547756 A1 | 6/2005 |
| EP | 1555204 A1 | 7/2005 |
| EP | 1566334 | 8/2005 |
| GB | 2312532 A | 10/1997 |
| JP | 59027722 | 2/1984 |
| JP | 59179228 | 10/1984 |
| JP | 61108404 A | 5/1986 |
| JP | 62207637 A | 9/1987 |
| JP | 04299110 A | 10/1992 |
| JP | 05042590 A | 2/1993 |
| JP | 6226356 | 8/1994 |
| JP | 7089353 | 4/1995 |
| JP | 08025386 A | 1/1996 |
| JP | 08085159 A | 4/1996 |
| JP | 10137853 A | 5/1998 |
| JP | 2003053851 A | 2/2003 |
| JP | 2004351882 A | 12/2004 |
| RU | 2144487 C1 | 1/2000 |
| RU | 2219058 C1 | 12/2003 |
| WO | 0024563 | 5/2000 |
| WO | 0037244 | 6/2000 |
| WO | 0196094 A2 | 12/2001 |
| WO | 0222440 A1 | 3/2002 |
| WO | 03082670 A1 | 10/2003 |
| WO | 2005/105413 A2 | 11/2005 |
| WO | 2005105413 | 11/2005 |
| WO | 2005105413 A2 | 11/2005 |
| WO | 2009004362 | 1/2009 |
| WO | 2009004364 | 1/2009 |

OTHER PUBLICATIONS

British Search Report for GB0813146.8 dated Nov. 17, 2008.
Russian OA—Decision on Granting with English translation dated Jun. 18, 2013.

* cited by examiner

RAMPED STIFFENER AND APPARATUS AND METHOD FOR FORMING THE SAME

RELATED APPLICATIONS

The present application is national phase of International Application Number PCT/GB2009/050845 filed Jul. 14, 2009, and claims priority from, British Application Number 0813146.8 filed Jul. 18, 2008.

BACKGROUND TO THE INVENTION

In the fabrication of composite structures, for example within the aerospace industry, structural members are often attached to a composite skin to provide reinforcement of the skin. Such structural members may include substantially elongated stiffening members often referred to as stringers or stiffeners. A typical example of the use of stiffeners within the aerospace industry is in the formation of an aircraft wing in which a composite stringer is attached to the inner surface of a wing cover, or skin. The stringers or stiffeners may be formed to exhibit various cross-sectional geometries but are typically formed to be T-section. Typically T-section stiffeners are produced from flat, uncured, pre-impregnated composite laminates that are formed into L-sections that are then compressed back-to-back producing the desired T-section. This produces a T-section stiffener that is easily attached to a flat composite skin. However, it is increasingly common practice to vary the thickness of the composite skin to locally vary the strength of the skin as desired. The variations in thickness produce ramped, or non-planar, sections across the composite skin to which the stringers are to be attached. To make the elongate stiffeners conform to the ramped skin surface the stiffeners must be deformed to the required profile after being formed into either the separate L-sections or the finished T-section. Since this involves deforming the stiffeners across a three dimensional section, rather than the two dimensional section of the original planar laminate, wrinkling often occurs in the T-section stiffener where a portion of the composite laminate is compressed. Such wrinkles provide localised stress points, thus reducing the overall strength of the stiffener and therefore requiring the stiffener to be made larger than would otherwise be necessary, and can also prevent L-sections from being compressed back-to-back to form the required T-section stiffener.

It would therefore be beneficial to be able to form such stiffeners without experiencing the problem of wrinkling.

SUMMARY OF THE INVENTION

According to a first aspect of the present invention there is provided a die tool for forming a C-section component having radiused shoulders, the die tool comprising:
 first and second outer dies, each outer die having a truncated conical portion connected to a flange portion by a radiused portion and being symmetrically disposed to one another along a common axis such that each flange portion is outermost, and a cylindrical outer support die located between the first and second outer dies; and
 first and second inner dies, each inner die comprising a disc having a substantially conical surface connected to a circumferential surface by a radiused portion and being symmetrically opposed to one another along a common axis such that the conical surfaces are outermost, and a cylindrical inner support die located between the first and second inner dies, wherein:
 the first and second inner dies and inner support die are arranged to be disposed between the flange portions of the first and second outer dies and are spaced apart there from a to define a cavity corresponding to the desired cross-section of the C-section component to be formed;
 the radiused portions of the inner and outer dies have a radius of curvature that varies about the circumference of the inner and outer dies; and
 the inner and outer dies are rotatable such that the radius of curvature of the radiused shoulders of the cavity varies as the dies are rotated.

Preferably the separation of both the inner and outer dies is variable. The separation of both the inner and outer dies may be arranged to be varied as the dies are rotated.

Additionally or alternatively, the length of at least one of the inner and outer support dies is variable. The length of the inner or outer support die may be arranged to be varied in dependence on the separation of the inner and outer dies.

At least one of the inner and outer support dies may have at least one end face that is non-orthogonal to its longitudinal axis such that the length of the cylindrical surface of the support die varies about its circumference.

Additionally or alternatively, the axis of rotation of adjacent inner and outer dies may be parallel.

Additionally or alternatively, the axis of rotation of each inner and outer die may be inclined with respect to the axis of rotation of the corresponding other inner and outer die.

According to a further aspect of the present invention there is provided a method of forming an elongate fibre reinforced composite C-section element having outer flanges connected to a central web by radiused shoulders, the radius of curvature of the radiused shoulders being greater at one point along the length of the formed C-section element than at another, the method comprising:
 passing an elongate portion of fibre reinforced composite material through the cavity of the die tool according to the previous aspect of the present invention; and
 rotating the inner and outer dies to change the radius of curvature of the radiused shoulders.

According to another aspect of the present invention there is provided a method of forming a T-section stiffener comprising forming a C-section element according to the method of the previous aspect of the present invention and subsequently folding the C-section element along the central axis of the central web.

According to another aspect of the present invention there is provided a fibre reinforced composite T-section stiffener formed according to the method of the preceding aspect of the present invention.

BRIEF DESCRIPTION OF THE DRAWINGS

Embodiments of the present invention are described, by way of non-limiting illustrative example only, below with reference to the accompanying drawings, of which.

DESCRIPTION OF PREFERRED EMBODIMENTS OF THE INVENTION

Figure 1:
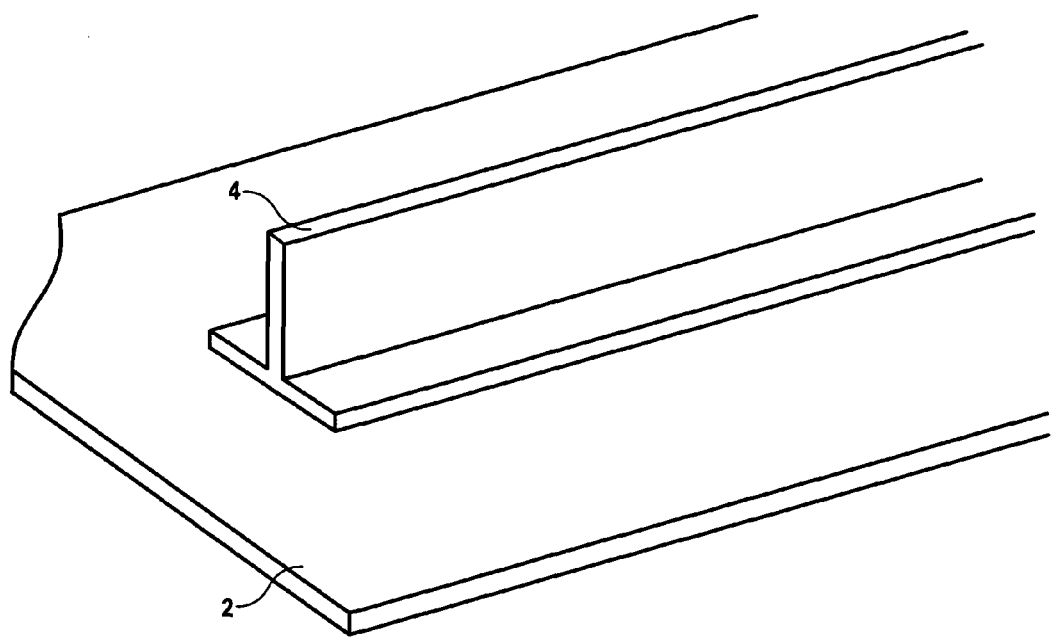
FIG. 1 illustrates a section of planar composite skin with an attached T-section stiffener.

FIG. 1 schematically illustrates a section of composite skin 2, such as an aircraft wing cover, to which a T-section stiffener 4 has been attached as is known from the prior art. The surface of the aircraft cover 2 to which the stiffener 4 has been attached is flat, meaning that the stiffener 4 need only be correspondingly flat across its attachment surface.

Figure 2:
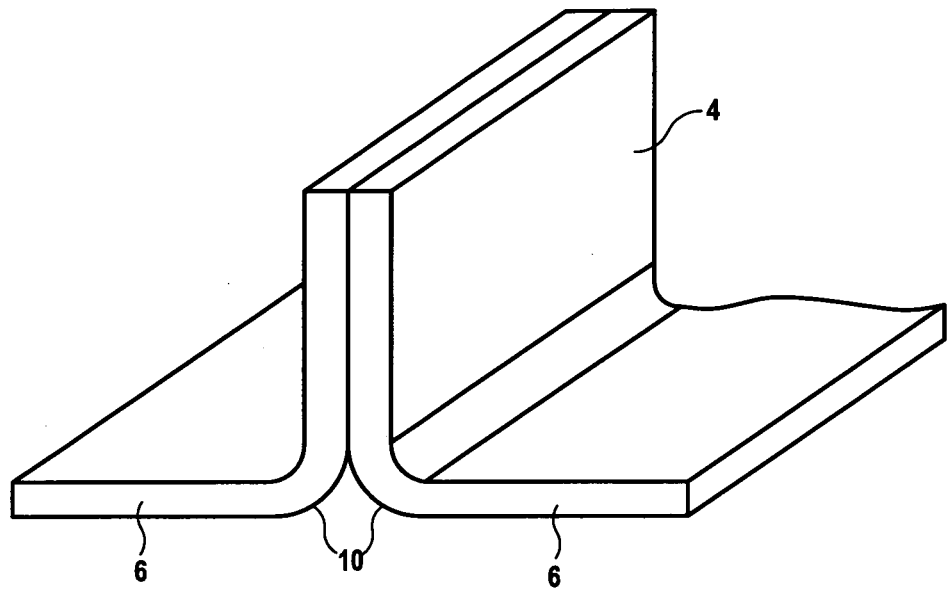
FIG. 2 illustrates a section of a T-section stiffener formed by two back-to-back L-section elements.
Figure 3:
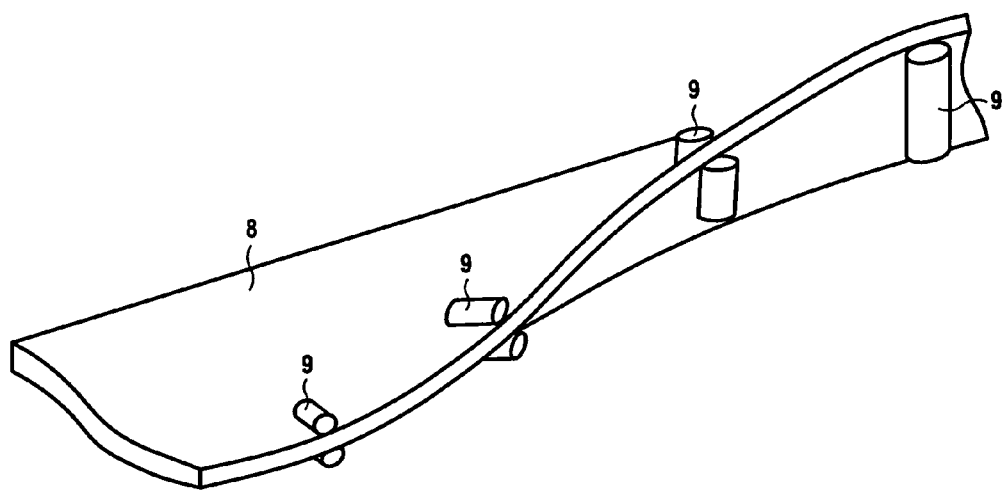
FIG. 3 schematically illustrates the formation of an L-section element from a planar laminate.

FIG. 2 illustrates an end portion of the stiffener 4 in better detail to illustrate a typical method of manufacture of such T-section stiffeners. The completed stiffener 4 actually comprises two separate L-section elongate elements 6 bonded together back-to-back. The L-section elements 6 are formed from elongate planar sections of composite laminate 8 (see FIG. 3) that is passed through a series of rollers and dies 9 that are arranged to bend one section of the elongate laminate in increments to approximately 90° to the remainder of the laminate, thus forming the L-section element 6 shown in FIG. 2. The planar composite laminate may be heated immediately prior to or as it is passed through the rollers and dies 8 to facilitate the bending of the laminate. As a consequence of this bending action the L-section elements 6 illustrated in FIG. 2 have a radiused elbow 10.

Figure 4:
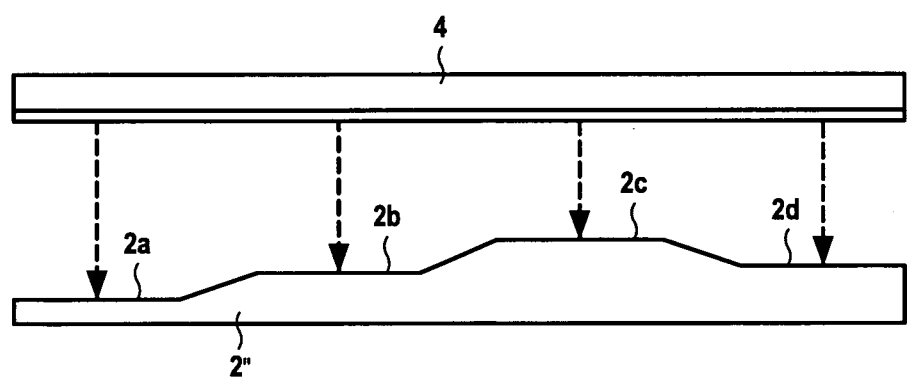
FIG. 4 schematically illustrates the placement of a T-section stiffener according to the prior art over a non-planar section of the composite skin.
Figure 5:
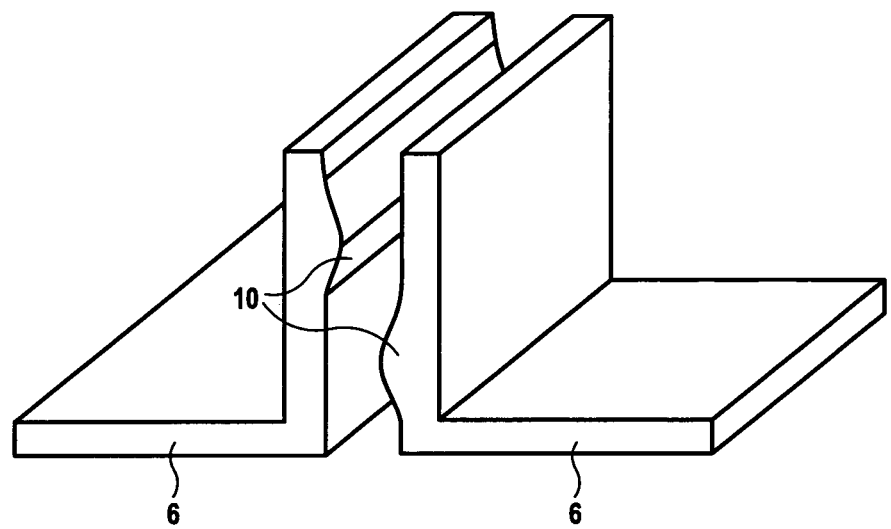
FIG. 5 schematically illustrates the formation of wrinkles onto adjacent L-section stiffener elements according to the prior art.

FIG. 4 schematically illustrates in cross-section a more typical arrangement of composite skin 2' and stiffener 4. In this more typical arrangement, the composite skin 2' is not planar but has sections of differing thickness 2A-2D, the section of differing thickness being provided in those areas that require greater or lower strength of the composite skin. As illustrated in FIG. 4, it will thus be appreciated that the prior art, planar, stiffener 4 cannot conform to the ramped profile of the skin cover 2' without undergoing some deformation. Whilst it is possible to deform the T-section stiffener to conform to the ramped profile of the composite cover 2', since the deformation involves either compressing or stretching those sections of the vertical portion of the T-section at the intersections between different thicknesses of the composite skin, wrinkling of the individual L-section elements 6 tends to occur. This is illustrated in FIG. 5 where each of the L-section elements 6 have an elongate wrinkle 12 formed on the surfaces to be abutted together to form the final T-section stiffener. The presence of these wrinkles 12 prevents the surfaces of the separate L-section elements from being abutted completely to one another, thus reducing the strength of the bond between the two L-section elements, and also introduce inherent weaknesses in the stiffener 4 due to such known processes as stress concentration.

Figure 6:
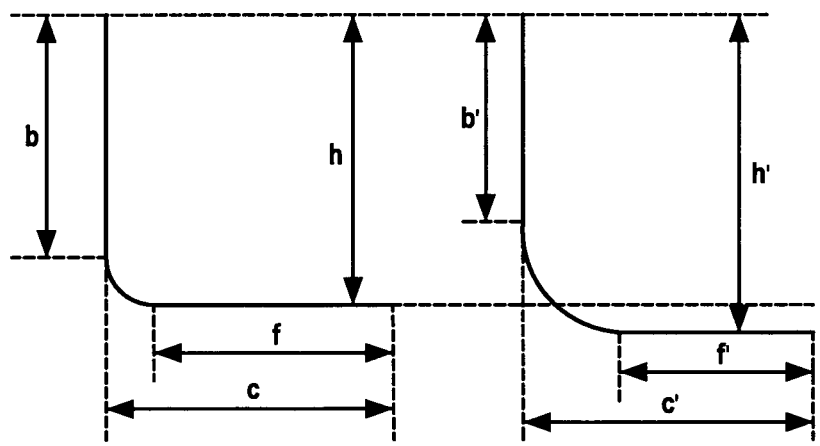
FIG. 6 schematically illustrates an L-section element with different radii of curvature according to an embodiment of the present invention.

The above described deformation of the L-section elements or final T-section stiffener can be avoided by varying the radius of curvature of the L-section elements, since this has the effect of varying the relative height of the stiffener feet (the part of the stiffener attached to the composite skin) relative to the overall height of the stiffener. This effect is illustrated in FIG. 6, in which two L-section elements are schematically represented in cross-section, one having a greater radius of curvature than the other. As previously mentioned, the planar part of the stiffener that is intended to be attached to the composite skin to be strengthened is referred to as the stiffener foot, whilst the height of the other planar section is generally referred to as the blade of the stiffener. The overall width of the stiffener, which is equal to the width of the foot plus the radius of curvature of the curved section joining the foot and blade is often referred to as the chord of the stiffener. In the cross-section illustrated in FIG. 6, the dimensions of the blade in the respective L-sections is represented by b, the width of the foot f and the chord c. The overall height of the stiffener measured from the top of the blade to the level of the foot is indicated by h. In most applications it is generally preferred to maintain the chord of the stiffener as constant and this illustrated in FIG. 6. The L-section element to the left-hand of FIG. 6 is shown having a smaller radius r, such that the chord of the stiffener c=r+f. In the L-section element on the right-hand side of FIG. 6 the radius curvature of the joining section has been increased to 3r. However, since it is desired to maintain chord c as constant the width of the foot f' has been reduced, as has the height of the blade b'. However, the overall height of the stiffener h'=b'+3r is greater in the stiffener on the right-hand side of FIG. 6 than that of the stiffener on the left-hand side where h=b+r. Consequently, the net effect is for the foot in the L-section element having the greater radius of curvature to be lower than that of the stiffener having the smaller radius of curvature and it is therefore possible to produce a stiffener that can be attached to a ramped skin without suffering deformation. An example of such a stiffener is illustrated in FIG. 7, in which it can be seen that where the radius of curvature of the section adjoining the blade b and foot f is at its greatest, the level of the foot is lower than for the sections where the radius of curvature is reduced.

Figure 7:
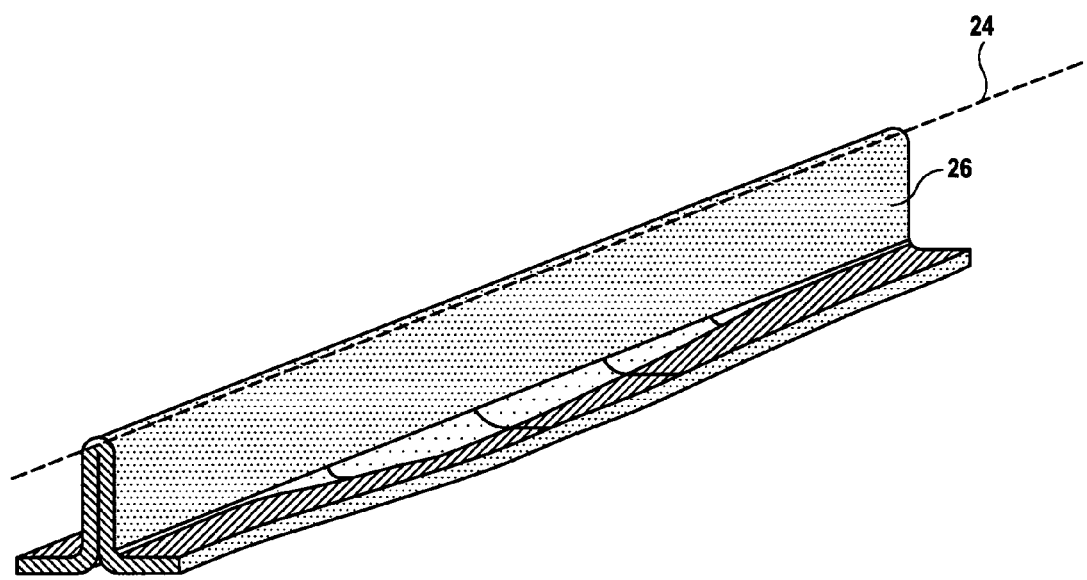
FIG. 7 schematically illustrates a T-section stiffener formed in accordance with the present invention.
Figure 8:
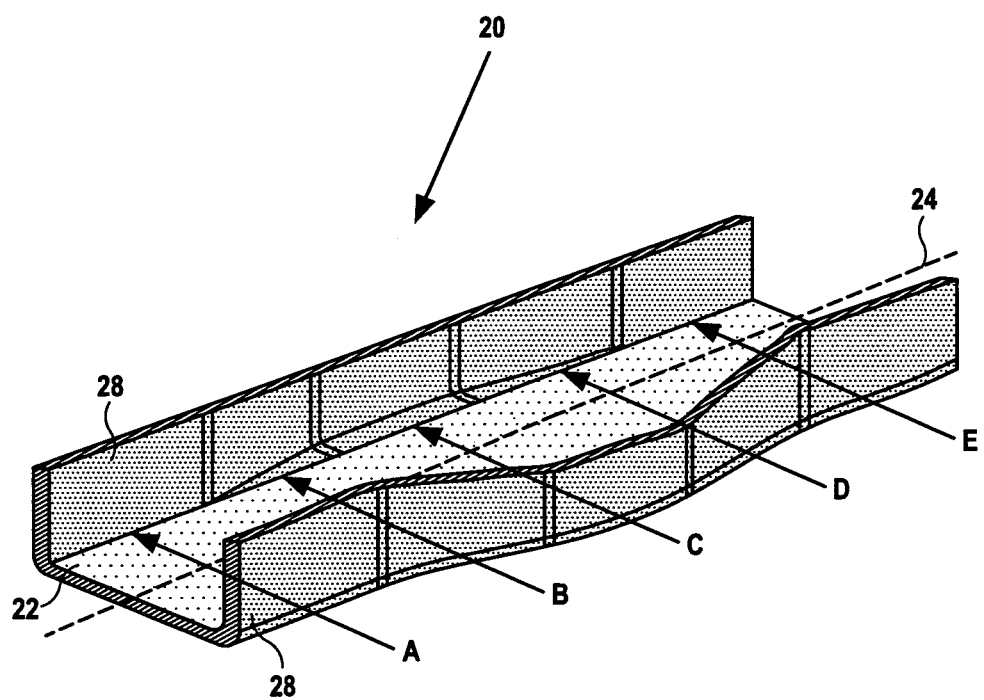
FIG. 8 schematically illustrates a C-section element formed in accordance with the present invention.

According to embodiments of the present invention stiffeners such as the example illustrated in FIG. 7 are produced by forming an elongate element with a C-shaped or U-shaped cross-section (effectively two L-section elements with the edges of their blades joined together) and subsequently folding the C-section elongate element along its length to form the desired T-section stiffener. An example of such a C-section elongate element formed in accordance with embodiments of the present invention is illustrated in FIG. 8. The C-section 20 shown in FIG. 8 as a central web 22 that when subsequently folded along its central axis, indicated by broken line 24 in FIG. 8, will form the central blade 26 of the stiffener illustrated in FIG. 7. Adjoined to each edge of the central web 22 are respective flanges 28 that correspond to the foot portions of the finally formed T-section stiffener. As illustrated schematically in FIG. 6, the flanges 28 are joined to the central web 22 by radiused sections. It will of course be appreciated that the flanges 28 and central web 22 are formed from a single, contiguous, piece of composite material. The C-section element 20 shown in FIG. 8 can be visually divided into separate sections A-E. Sections A and E have a minimum radius of curvature between the flanges 28 and central web 22, whilst section C has a maximum radius of curvature, thus causing the flange section at section C to be outwardly displaced relative to the flanges 28 for sections A and E. When the C-section element is folded along the central axis 24 this outward displacement of the flanges 28 at section C is translated into the ramped-down section of the T-stiffener. The radius of curvature between the flanges 28 and central web 22 in sections B and D that are between section C and A and E vary in related curvature between the maximum and minimum values to provide a smooth transition, which in the final T-section stiffener correspond to those sections in which the foot is in a plane diagonal to the planes in which the foot lies for those sections with a constant radius of curvature of either the minimum or maximum values.

Figure 9:
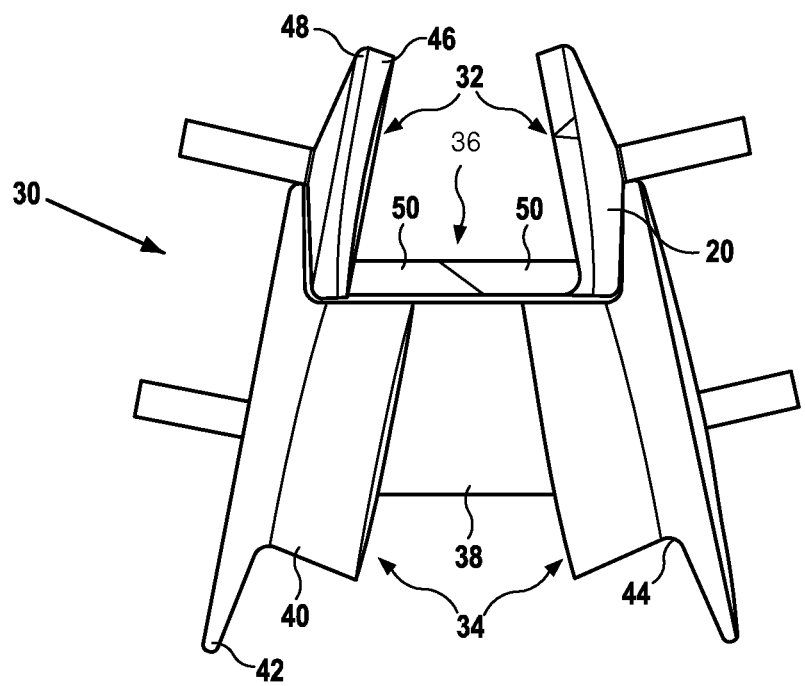
FIG. 9 schematically illustrates a die tool according to an embodiment of the present invention in a first configuration.
Figure 10:
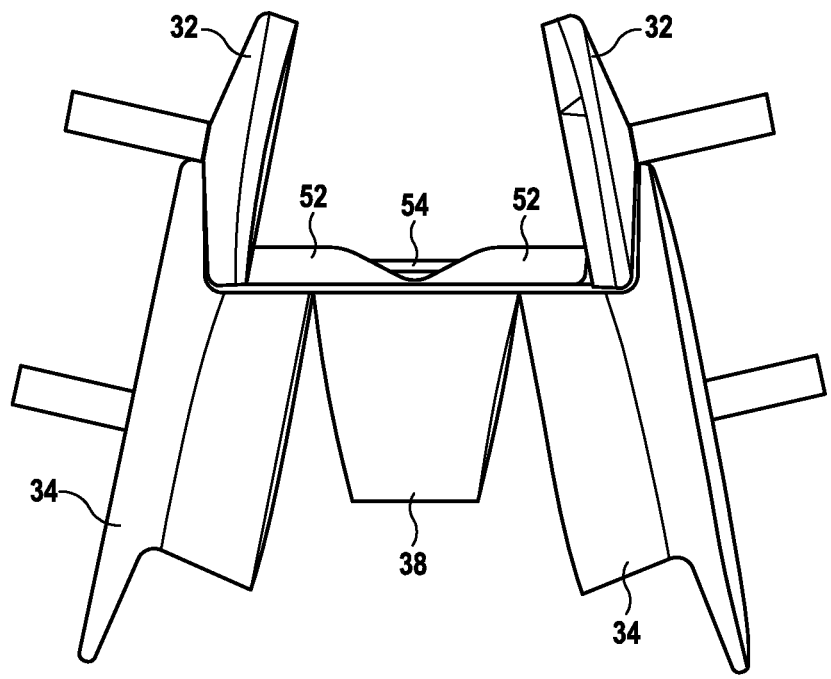
FIG. 10 schematically illustrates the die tool shown in FIG. 9 in a second configuration.

The C-section element 20 illustrated in FIG. 8 is manufactured in accordance with embodiments of the present invention using cold forming techniques in which a C-section elongate element having a uniform cross-section is passed through a die tool shaped so as to impart the desired radius of curvatures between the central web 22 and flanges 28. A suitable die tool according to an embodiment of the present invention is illustrated in FIGS. 9 and 10. Referring to FIG. 9, the die tool 30 comprises a set of individual dies arranged to form a cavity corresponding to the desired cross-section of the C-section element, with the C-section element being passed through the cavity to impart the desired final cross-section. In FIG. 9 the cavity is illustrated with a C-section element 20 in location. The die tool 30 comprises a pair of inner dies 32, a pair of outer dies 34, an inner support die 36 and an outer support die 38. Each outer die 34 comprises a truncated conical portion 40 and a flange portion 42 with a radiused region 44 formed between the flange portion and truncated conical portion. The inner surface of the circular flange portion 42 also defines a truncated cone, although the angle of inclination with respect to the "base" of the truncated cone is significantly less than that of the truncated conical portion 40 such that the inclined surfaces of the circular flange portion 42 and truncated conical portion 40 are at substantially 90° to one another. The radius of curvature of the radiused region 44 varies between minimum and a maximum value around the circumference of the outer die. In preferred embodiments, and in the embodiment illustrated in FIGS. 9 and 10, the points at which the radius of curvature is at the minimum and maximum values are opposite one another on the surface of the outer die, that is to say they are 180° angularly spaced apart from one another, and the rate of change of radius of curvature is constant between the minimum and maximum values. However, it will be understood that other angular displacements of the minimum and maximum values of radius of curvature and of the rate of change of the radius of curvature may equally be implemented in alternative embodiments of the present invention. Each outer die 34 is orientated such that the flange portions 42 are outer most, with the outer dies being symmetrically disposed with respect to one another. The outer support die 38 is arranged to be located between the two outer dies 34. The outer support die comprises a truncated cylinder with both flat end surfaces being inclined in the opposite sense to the longitudinal axis of the outer support die 38, such that the distance between the end surfaces along the outer circumferential surface of the outer die varies between a minimum value and a maximum value, the points at which the minimum and maximum values occur being preferably angularly displaced by 180°. The outer circumferential surface of the inner support die 38, the circumferential surfaces of the truncated conical portions 40 of each of the outer dies 34, the surface of the radiused regions 44 of the outer support die and the inner surface of the flange portions 42 together define the outer boundary of the cavity through which the C-section element 20 is to be passed.

Each inner die 32 comprises a circular disk portion 46, with the surface of the disk facing the flange portion 42 of the neighbouring outer die being substantially conical, the inclination of this surface being relatively small in relation to the non-inclined base surface of the disk portion 46. A second radiused region 48 is formed between the circumferential surface of the disk portion 46 and the inclined surface, the radius of curvature of the second radiused region varying between a minimum and maximum value in an analogous fashion to the radiused region 44 of the outer dies 34. The inner dies 32 are disposed in the die tool 30 spaced apart from one another with the flat base surfaces of each inner die facing one another and with the inner dies 32 located between the flange portions 42 of the outer dies 34. Located between the outer edges of the inner dies 32 is the inner support die 36. This comprises two truncated cylindrical portions 50, with each truncated cylindrical portion having and/end face 52 arranged to be adjacent to one another. The angle of the end faces 52 relative to the longitudinal axis of the truncated cylindrical portions 50 are the same such that in a first configuration (as shown in FIG. 9) the two separate truncated cylindrical portions 50 can be disposed adjacent to one another such that their respective/end faces are parallel and in contact with one another. Each truncated cylindrical portion 50 is arranged to be rotatable with respect to the alert truncated cylindrical portion about their central axis.

Each of the inner and outer dies are arranged to be rotatable about their central axes. In the embodiments illustrated in FIGS. 9 and 10 each of the inner and outer dies is formed with a stub axle coincident with the respective central axes. The outer support die 38 is also arranged to be rotated about its central axis. In the configuration illustrated in FIG. 9 the inner and outer dies 32, 34 are orientated such that the point on each of the first and second radiused regions 44, 48 of the outer and inner die 32, 34 respectively at which the radius of curvature is at a maximum are opposite one another. Consequently, the cavity formed between on the one hand the inner dies 32 and inner support die 36 and on the other hand the outer dies 34 and outer support die 38 corresponds to the cross-section of the C-section element 20 shown in FIG. 8 across-section C. To produce the desired C-section element a preformed elongate element is forced through the cavity defined by the die tool with the individual dies stationery. Referring back to FIG. 6, it will be recalled that when the radius of curvature of the curved portions of the stiffener is at the maximum value then for a stiffener of constant chord c the height of the blade b' is at a minimum. The width of the central web 22 of the desired resultant C-section element 20 corresponds to twice the blade height (since the resulting stiffener is formed by folding the C-section elements along its central axis). Accordingly, the outer support die 38 is, in the configuration illustrated in FIG. 9, rotated such that the length of its outer circumferential surface that contributes to defining the cavity through which the C-section is extruded is the minimum length. Correspondingly, the separate truncated cylindrical portions 50 of the inner support die 36 are rotated relative to one another such that their/end faces 52 are parallel and in contact with one another, thus minimising the overall length of the inner support die. To produce a C-section element having a minimum radius of curvature between the side flanges 28 and central web 22 requires the inner and outer dies 32, 34 to be rotated about their central axes such that the radius of curvature on the respective radiused regions that are opposite one another and thus define the cavity through which the C-section must be extruded are at their minimum values. This is the configuration shown in FIG. 10. As previously mentioned, when the radius of curvature between the flanges 28 and central web 22 of the C-section to be produced is at the minimum value, and with a constant chord length, the height of the blade, and thus the width of the central web 22, is at a maximum, i.e. it is greater than for the opposite configuration shown in FIG. 9. Consequently it is necessary for each pair of inner and outer dies to be arranged such that their separation can be varied as they are rotated. The desired mechanical implementation to achieve the combined rotational and translational movements does not fall within the scope of the present invention and will be within the technical capabilities of the person skilled in the art without exercising any inventive skill. Since the separation of the inner and outer dies 34, 36 is increased in the configuration shown in FIG. 10 relative to the configuration shown in FIG. 9, the length of the inner and outer support dies 36, 38 at their surfaces that define the cavity there between preferably also increases. This is achieved in relation to the outer support die 38 by also rotating the outer support die about its central axis so as to present its longest circumferential surface to the boundary of the cavity. The inner support die 36 is increased in overall length by rotating the separate truncated cylindrical portions 50 relative to one another, which by virtue of their opposing/end faces 52 cause the separate cylindrical portions 50 to move away from one another. The means of rotating the individual truncated cylindrical portions 50 is again beyond the scope of the present invention and may be implemented as best seen fit by a person skilled in the art, but may be achieved by mounting the individual cylindrical portions 50 on a central axis 54, as indicated in FIG. 10.

The transitional sections of the C-section element 20, indicated as sections B and D in FIG. 8 can be achieved by rotating the inner and outer dies 32, 34 in synchronicity with each other and with the rotation of the outer support die 38 and the separate cylindrical portions 50 of the inner support die 36 whilst the C-section element is being passed through the cavity formed by the dies. Whenever a constant radius of curvature, i.e. cross-section of the C-section element is required the various dies of the die tool are kept stationery whilst the C-section element is extruded through the cavity.

The die tool of embodiments of the present invention thus enable a C-section element having a radius of curvature between blade and foot segments that may be varied to be produced, thus allowing a T-section stiffener with varying foot height to be produced.

The invention claimed is:

1. A die tool for forming a C-section component having radiused shoulders, the die tool comprising:
    first and second outer dies, each outer die having a truncated conical portion, a flange portion, and an outer die radiused portion between the flange portion and the conical portion, the first and second outer dies being symmetrically disposed to one another along a common axis such that each flange portion is outermost, and a cylindrical outer support die located between the first and second outer dies; and
    first and second inner dies, each inner die comprising a disc having a substantially conical surface, a circumferential surface, and an inner die radiused portion between the conical surface and the circumferential surface, the first and second inner dies being symmetrically opposed to one another along a common axis such that the conical surfaces face outwardly, and a cylindrical inner support die located between the first and second inner dies, wherein:
    the first and second inner dies and inner support die are arranged to be disposed between the flange portions of the first and second outer dies and are spaced apart there from to define a cavity corresponding to the desired cross-section of the C-section component to be formed; and
    the radiused portions of the inner and outer dies have a radius of curvature that varies about the circumference of the inner and outer dies;
    the inner and outer dies are rotatable such that the radius of curvature of the radiused shoulders of the cavity varies as the dies are rotated.

2. A die tool according to claim 1, wherein the separation of both the inner and outer dies is variable.

3. A die tool according to claim 2, wherein the separation of both the inner and outer dies is arranged to be varied as the dies are rotated.

4. A die tool according to claim 2, wherein the length of at least one of the inner and outer support dies is variable.

5. A die tool according to claim 4, wherein the length of the inner or outer support die is arranged to be varied in dependence on the separation of the inner and outer dies.

6. A die tool according to claim 2, wherein at least one of the inner and outer support dies has at least one end face that is non-orthogonal to its longitudinal axis such that the length of the cylindrical surface of the support die varies about its circumference.

7. A die tool according to claim 1, wherein the axis of rotation of adjacent inner and outer dies are parallel.

8. A die tool according to claim 1, wherein the axis of rotation of each inner and outer die is inclined with respect to the axis of rotation of the corresponding other inner and outer die.

9. A method of forming an elongate fibre reinforced composite C-section element having outer flanges connected to a central web by radiused shoulders, the radius of curvature of the radiused shoulders being greater at one point along the length of the formed C-section element than at another, the method comprising:
    providing a die tool according to claim 1;
    passing an elongate portion of fibre reinforced composite material through the cavity of the die tool; and rotating the inner and outer dies to change the radius of curvature of the radiused shoulders.

10. A method of forming a T-section stiffener comprising forming a C-section element according to the method of claim 9 and subsequently folding the C-section element along the central axis of the central web.

* * * * *